Patented Sept. 11, 1928.

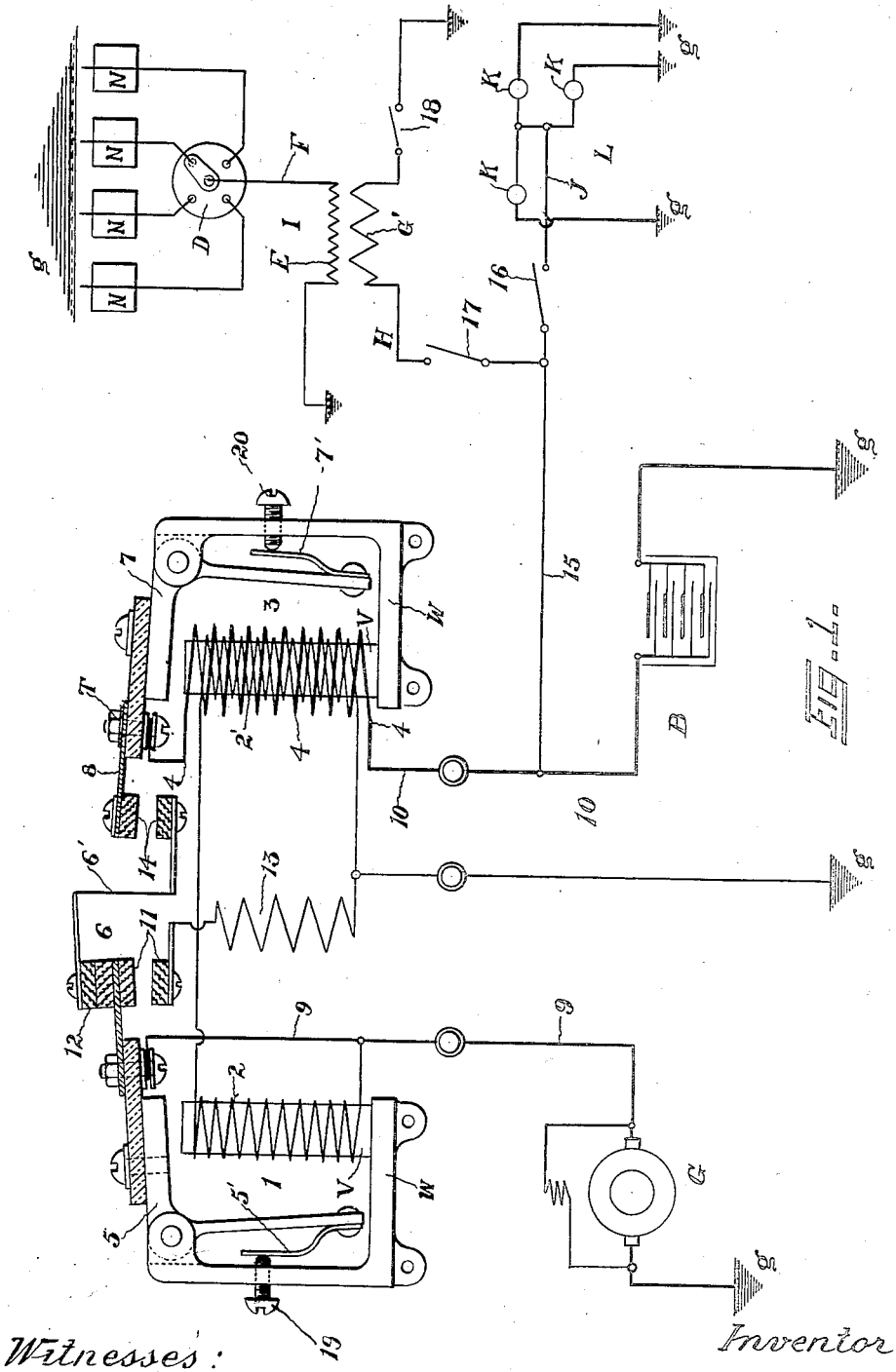

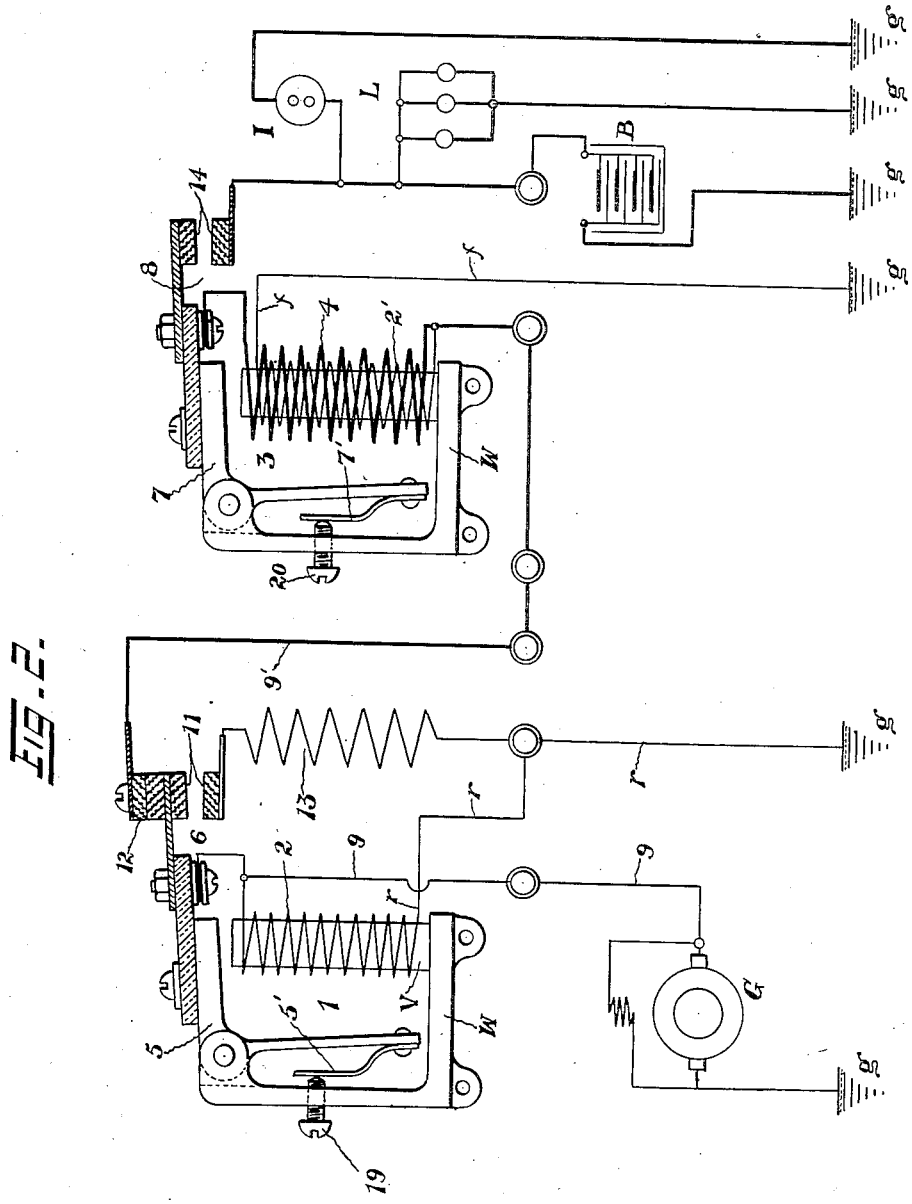

1,684,071

UNITED STATES PATENT OFFICE.

JOHN R. PRICE, OF CHARLOTTESVILLE, VIRGINIA.

ELECTRIC-CIRCUIT CONTROL SYSTEM.

Application filed December 1, 1922. Serial No. 604,351.

My present invention relates to an improvement in electric circuit control systems and in its present preferred embodiment, it is shown adapted for use to automobile ignition and lighting requirements and more especially to that type of electric installation wherein the electric current supply for the ignition and lighting systems of a car is obtained from both the generator and the storage battery, and more especially wherein the storage battery is charged from time to time by the generator.

As it is the present practice to provide automobiles with a dual source of electric current supply, wherein an electric generator is driven by the gas engine direct, and wherein the current generated thereby may be either utilized to charge the batteries, or to supply either the lighting or the ignition systems directly or both, and whereby the current supply from the generator may be utilized in conjunction with the batteries, or during the charging operation, better known as "floating the line".

In order to prevent detrimental overloading of the lighting circuit or the ignition circuit, through the combined voltage of the generator and the batteries at any time, I have provided an automatic electric switch system whereby to automatically control the shifting of the supply-current whether it is obtained from the batteries or the generator to either one or both of the above noted circuits.

A further improvement in my device, is such that while it operates to keep the current supply to both circuits down to the desired voltage and thereby becomes operative when either the lighting or the ignition systems are in danger of overload, my invention also operates to prevent overcharge of the battery during the charge periods, thereby protecting the storage battery as well as the circuits.

Further advantages will be disclosed as the specification proceeds.

In the drawings, Fig. 1 is a diagrammatic layout and shows my device arranged for a single battery full voltage cut-out.

Fig. 2 is also a diagrammatic layout and shows a combined battery cut-out with reverse current switch.

My device comprises, in combination, a magnetic relay generally denoted by 1, comprising a core V wound with a primary shunt coil or winding 2, and a second magnetic relay generally denoted by 3, the same comprising a core V wound with a shunt coil or winding 2' in series with said first relay. Said second relay also has a series coil or winding 4 wound about its core, one end of which is connected by a wire 10 to a storage battery B, the other end of said winding 4 being connected to a terminal T on a switch 8 which will be later described.

Both relays, structurally speaking, are quite similar and comprise a frame generally denoted by W, upon which are mounted the cores V.

Relay 1, has a pivoted armature 5 upon the frame W, normally kept open by an adjustable tensional spring 5', operating a double-throw switch 6; relay 3 has a similar armature 7, similarly kept open by an adjustable spring 7', for operating the single switch 8. Switch 6, is directly connected to positive side of generator G by wire 9, 9.

Double throw-switch 6, has two terminals 11 and 12, terminal 11 being connected to a resistance circuit coil or artificial load 13 connected to ground $g$ on the other side, terminal 12 being connected to terminal 14 of switch 8.

A positive line 15 leads from the positive line 10 to the battery B, to ignition switch 17 and lighting switch 16, whereby it controls these respective systems constituting translating loads or devices. The ignition system consists primarily in four ignition devices diagrammatically indicated by the rectangles N, in representation of a four-cylinder ignition unit, the ground $g$, being shown thereabove, and from each of the said ignition elements N, ignition wires are led to a distributor D, the said distributor being fed by a lead F from the high tension side E of a high tension coil, the low tension side of said coil being indicated by G' and the lead H from said low tension coil G' being connected to the manually operated ignition switch 17. The other end of said coil G' may be controlled by a ground switch 18, if desired.

In order to control the lighting system, the lighting switch 16 controls a lead J which in turn is connected to a plurality of lamps K, which may be grounded in the usual manner as indicated by the grounds $g$. From the foregoing description it will be ascertained that either one of the two above noted circuits or both of them, may be manually controlled at will to be supplied from the current supply source.

The operation of this device as as follows:

The current passes from generator G by wire 9, around both magnetic relays 1 and 3, along winding 2 to ground $g$; both relays become excited but will only pull down their respective armatures 5 and 7 when the voltage has become sufficiently high to overcome the resistance of the armature springs 5' and 7', the tension of which is regulated by screws 19 and 20, respectively.

Spring 7' is so regulated that armature 7 will only be pulled down when the generator voltage becomes higher than the normal battery voltage.

After the generator voltage increases over the normal battery voltage, armature 7 is drawn down thereby closing switch 8 and connecting terminals 14, whereupon the generator current will flow through line 9, through switch 6, line 6', through switch 8 and thence down through winding 4 on relay 3, thence through line 10 to battery B, thereby charging the said battery, if it requires charging.

In order to control the source of current supply from either the battery or the generator to either the ignition or the lighting system, the ignition system I, or lighting system L, I have provided a pair of manual switches 17 and 16, which control both said circuits respectively. After the charging of the battery by the generator as above set forth, and should switches 17 or 16 be opened either singly or simultaneously, it is obvious that the voltage of the generator G might become excessive. Therefore it becomes necessary upon the instant of opening either switch 17 or 16 to provide means whereby the generator or the battery will be immediately cut out and its quota of current eliminated. Also it is desirable after the battery has been charged, to cut out the generator, and this is accomplished as follows:

The armature spring 5' may be so regulated that when the generator voltage, as above stated, or for any reason, reaches an amount that might be detrimental to either the ignition or lighting system or the battery, the armature 5 will be drawn down, thereby closing switch 6, thereby causing the generator current to pass from the line 9, 9, through contacts 11 down through resistance or load coil 13, to ground $g$, thereby cutting out the generator from the battery ignition, and lamp circuits. When the contact at 12 is first broken, current in the winding 2 is increased thus increasing the magnetic pull and making the action of the switch certain.

It will be noted then, that the lighting and ignition circuits L and I, respectively, are then merely supplied with current from the battery B through lines 10 and 15 and through the switches 16 and 17, according to the desired requirements of lighting or ignition or both, and will be so supplied until the storage battery B becomes again exhausted, or until resumption of normal voltage reduces the magnetic pull of the relay 1 to a point where the spring 5 will overcome the pull of the magnetic attraction of relay 1 on armature 5 and again close the switch 8.

As long as the armature 5 remains down, the generator current will continue to flow through and heat the resistance coil 13, but as the said coil thus becomes heated, it increases its resistance to the generator current flow and thus reduces the waste of power until the voltage of the generator is reduced to a point insufficient to hold down armature 5 and switch 6 will again be thrown to contact 12 by the spring 5'.

When the resistance is again cut out of the generator circuit, the generator current passes through the windings 2 and 2', and repeats the operations as described above.

Should the battery voltage become greater than that of the generator, current will pass in reverse direction through the winding 4 and neutralize the magnetic pull of relay 3, thus opening switch 8 and preventing short-circuiting through the generator.

The device of Fig. 2 is the same in operation as that of Fig. 1, and is similar in structure. However, the relation of the winding to the switch 8 is reversed, the current passing from the conductor $e'$ to the winding 4 and thence through the switch to the battery. Also, the shunt coil 2' of relay 3 takes current from the conductor 9' so that there is no waste of current through winding 2' when switch 6 is open.

Fig. 2 shows separate grounds $f$ and $r$ for the coils 2' and 13.

I claim:

1. The combination with a load, a battery for supplying current to said load, said battery and generator being normally out of circuit with each other, of means automatically operative to close the circuit through said generator and battery when the voltage of the generator exceeds that of the battery, means automatically operative to open said circuit when the battery is fully charged, a resistance coil, and means automatically operative on the opening of said circuit to close a circuit through said generator and resistance coil.

2. In combination, a circuit including a generator and a storage battery; a yieldably closed switch and a yieldably open switch in series with each other in said circuit between the generator and battery, the yieldably open switch being nearest the battery; means to open the yieldably closed switch whenever the voltage of the generator exceeds a predetermined amount; means to close the yieldably open switch when the voltage of the generator reaches a predetermined amount; each means including an armature connected to the switch and an electromagnet to attract the armature comprising a coil shunted around the generator; a resistance; means in part including said yieldably closed switch whereby when the latter is opened said resistance is shunted around the generator; and a series coil in said circuit between the yieldably open switch and the battery wound opposing the shunt coil of the yieldably open switch if current flows from the battery to the generator.

3. The combination with an electric light circuit and an ignition circuit, a battery for supplying current to said circuits, and a generator for charging said battery, said battery and generator being normally out of circuit with each other, of means automatically operative to close the circuit through said generator and battery when the voltage of the generator exceeds that of the battery, means for automatically operative to open said circuit when the battery is fully charged, a resistance coil, and means automatically operative on the opening of said circuit to close a circuit through said generator and resistance coil.

4. The combination, with an electric light circuit and an ignition circuit, a battery for supplyng current to said circuits, and a generator for charging said battery, of means for automatically closing a circuit through said generator and battery when the voltage of the generator exceeds that of the battery, said means comprising a fixed contact in electrical connection with the generator, a movable armature having a contact in electrical connection with the battery, and an electro-magnet operable by the generator to attract the armature into circuit-closing position; means for opening said generator-battery circuit when the battery has received a predetermined charge, said means comprising an armature in said circuit and an electro-magnet operable to attract said armature away from circuit closing position, a resistance coil normally out of circuit with said generator, and means for closing a circuit through the generator and said resistance coil when said last armature is attracted by its magnet.

5. The combination, with an electric light circuit and an ignition circuit, a battery for supplying current to said circuits, and a generator for charging said battery, of means for automatically closing a circuit through said generator and battery when the voltage of the generator exceeds that of the battery, said means comprising a fixed contact in electrical connection with the generator, a movable armature having a contact in electrical connection with the battery, and an electro-magnet operable by the generator to attract the armature into circuit closing position; means for opening said generator-battery circuit when the battery has received a predetermined charge, said means comprising an armature in said circuit and an electro-magnet operable to attract said armature away from said circuit closing position, a resistance coil normally out of circuit with said generator, means for closing a circuit through the generator and said resistance coil when said last armature is attracted by its magnet, said means comprising a fixed contact in electrical connection with said resistance coil and located in the path of the armature, said armature carrying a second contact in electrical connection with the generator.

6. In an electric circuit control system, the combination with a first and a second source of supply of electricity, of a relay having an electro-magnet operated by the first source of supply and a movable switch constituting an armature for said magnet and normally spaced away therefrom, a second relay having an electro-magnet operated by the second source of supply and a movable switch constituting an armature for the second magnet and normally spaced away therefrom, a fixed contact member located between the switches, the first switch normally being in contact therewith and the second switch normally being out of contact therewith, a resistance coil connected to a ground, a fixed contact appurtenant to the coil and located adjacent to the first switch, means for maintaining the first switch normally spaced away from the first magnet and in contact with said first mentioned fixed contact member and permitting movement of the switch by the magnet out of contact with said first mentioned fixed contact member and into contact with the contact appurtenant to said coil when the voltage of the first source of supply exceeds a predetermined value, and means for maintaining the second switch normally spaced away from the second magnet and out of contact with said first mentioned fixed contact member and permitting movement of the switch by the second magnet into contact with said fixed contact member when the voltage of said first source of supply exceeds the voltage of the second source of supply.

7. The combination with a generator and a battery, of a first magnetic core, a second magnetic core, a movable switch adjacent to the first core and permanently connected to the generator, a winding connected to said permanent connection and passing around the first and second cores and terminating in a ground, a movable switch adjacent to the second core and permanently connected to the battery by a winding passing around the second core and over the first winding, said cores and windings constituting electro-magnets and said switches constituting armatures for the magnets, a fixed contact member located between said switches and having two contact points, a resistance coil adjacent to said member and terminating in a ground, a fixed contact appurtenant to the coil, said first switch having a contact point contactible with said contact appurtenant to the coil and having a contact point normally in contact with one of the contact points of said fixed contact member, said second switch having a contact point contactible with the other contact point of said fixed contact member and normally out of contact therewith, means for maintaining the first switch normally in contact with said fixed contact member and permitting movement of the switch by the first magnet into contact with the contact appurtenant to said coil when the voltage of the generator exceeds a predetermined value, and means for maintaining the second switch normally out of contact with said fixed contact member and permitting movement of the switch by the second magnet into contact with said member when the voltage of the generator exceeds the voltage of the battery.

8. In combination, a circuit including a generator and a translating load interposed therein; a storage battery connected across said circuit in parallel with the generator; a yieldably closed switch and a yieldably open switch interposed in series with each other in said circuit between the generator and battery; a pair of means respectively adapted to open the yieldably closed switch when the voltage is too high and to close the yieldably open switch when the voltage reaches normal, each means including an armature connected to the switch and an electromagnet adapted to attract the armature and comprising a shunt coil, the coils being connected in series with each other and shunted around the generator; an artificial load; means in part including said yieldably closed switch whereby when the latter is opened said artificial load is shunted around the generator; and a series coil interposed in said circuit between the yieldably open switch and said battery adapted to supplement the shunt coil of the yieldably open switch when current flows from the generator to the storage battery and to oppose said shunt coil when current flows in the opposite direction.

JOHN R. PRICE.